United States Patent [19]
Cracraft et al.

[11] 3,836,955
[45] Sept. 17, 1974

[54] MOTOR VEHICLE SEAT BELT SAFETY SYSTEM

[75] Inventors: Larry F. Cracraft; David E. Houser; Edward G. Whitaker, all of Kokomo, Ind.

[73] Assignee: General Motors Corporation, Detroit, Mich.

[22] Filed: Apr. 23, 1973

[21] Appl. No.: 353,598

[52] U.S. Cl. ........... 340/52 E, 340/278, 307/10 SB, 180/82 C
[51] Int. Cl. .......................................... B60r 21/10
[58] Field of Search ....... 340/52 E, 278; 307/10 SB; 180/82 C

[56] References Cited
UNITED STATES PATENTS
3,742,448  6/1973  Motz .............................. 340/52 E

*Primary Examiner*—Alvin H. Waring
*Attorney, Agent, or Firm*—Albert F. Duke

[57] ABSTRACT

A bipolar integrated circuit is disclosed which includes a sequence latch for detecting an improper sequential operation of a seat switch and a seat belt switch for providing a violation signal which permits energization of a vehicle seat belt warning circuit and prevents energization of the vehicle starter solenoid. The circuit further includes a good start latch which permits restarting of the vehicle as long as the driver's seat is occupied. The latches are interconnected so that when the sequence latch is enabled and the good start latch is disabled and once the good start latch is enabled the sequence latch is disabled. Means are provided in each latch circuit to stabilize the latches against voltage transient prevalent in vehicle operation. A seat bounce protection circuit is proposed which prevents momentary deactuation of the seat switch from affecting the state of the latches.

8 Claims, 3 Drawing Figures

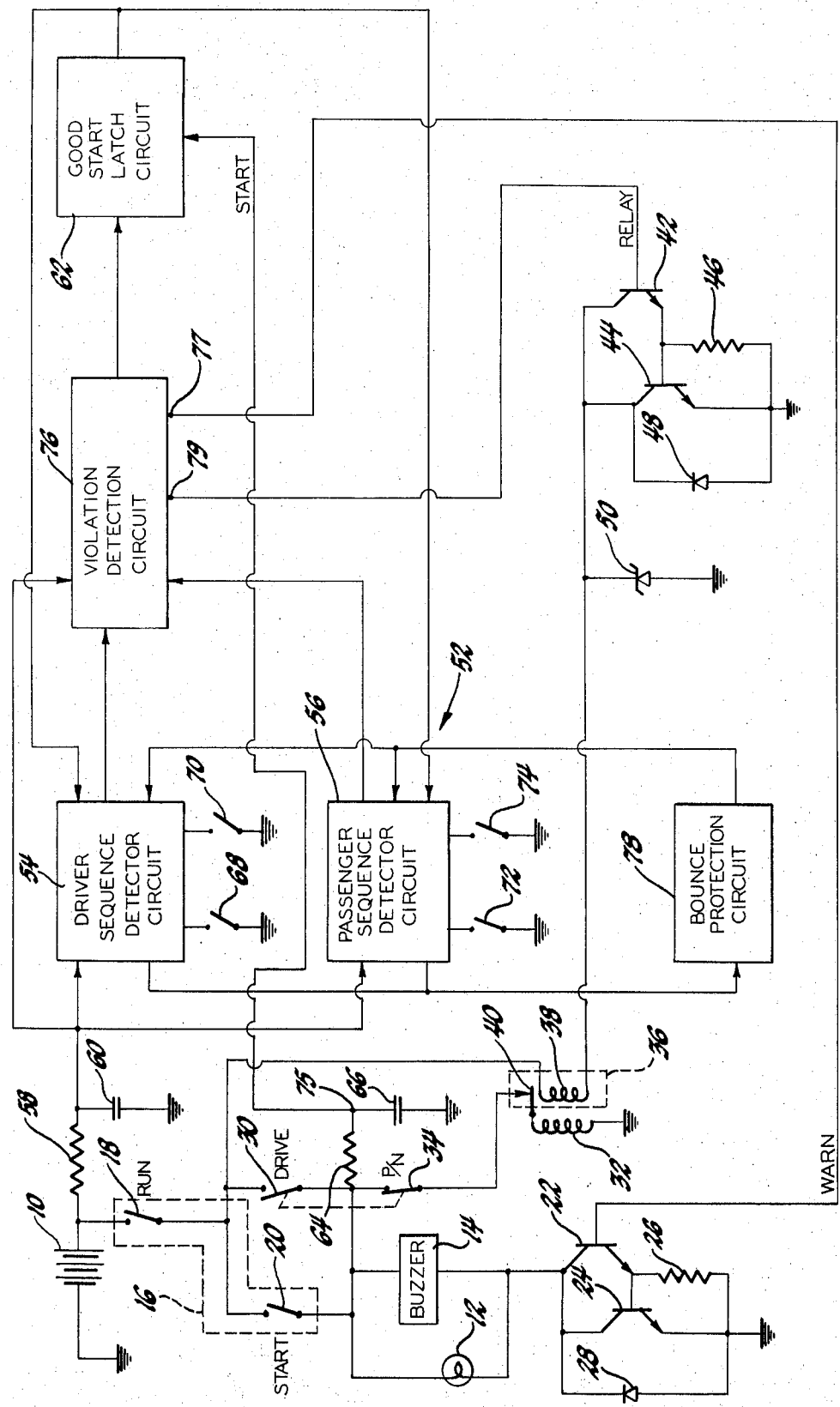

MOTOR VEHICLE SEAT BELT SAFETY SYSTEM

This invention relates to motor vehicle seat belt safety systems and more particularly to a bipolar integrated circuit for preventing vehicle starting and for energizing indicators on the vehicle unless the vehicle seat belts are properly used.

Present vehicles are provided with a seat belt warning system including a lamp and buzzer which are energized in response to actuation of a seat switch and placement of the transmission selector in a forward drive position. The visual and audible signal produced reminds the occupant to fasten his seat belt. Fastening of the seat belts actuates a belt switch which interrupts the indicator circuit. It has been proposed that an interrupt relay be provided in parallel with the indicator which would interrupt the starter circuit of the vehicle and prevent vehicle starting unless the seat belts are fastened. In order to prevent overriding of the system by maintaining the seat belts in a fastened condition at all times, sequencing logic has been proposed which requires that the seat belt switch be actuated subsequent to actuation of the seat switch in order to interrupt the warning and relay circuits.

It is an object of the present invention to provide an improved circuit for controlling a seat belt warning indicator or starter interrupt relay on a motor vehicle.

It is another object of the present invention to provide such a circuit which is relatively immune to voltage fluctuations and noise transients in the circuit arising from motor vehicle operation.

The circuit of the present invention is a bipolar integrated circuit comprising a "sequence" latch and a "good start" latch, each of which are relatively simple in construction and include regeneratively coupled PNP and NPN transistors. The sequence latch is turned on in response to an improper sequential operation of the seat switch and belt switch, i.e. the seat belts are fastened at the time the seat is occupied, to provide a violation signal. The violation signal is used to energize the seat belt indicator to provide a warning and to energize the interrupt relay to break the starter solenoid circuit of the vehicle. The good start latch may be turned on if the seat is occupied by moving the ignition switch to the start position but is inhibited in the presence of the violation signal. Once the good start latch is turned on it is effective to provide a restart capability for the vehicle as long as the seat is occupied regardless of whether the seat belts are fastened or not. The sequence latch and the good start latch are interconnected so that once the sequence latch is turned on the good start latch is inhibited and once the good start latch is turned on the sequence latch is inhibited. Because of the importance of proper operation of the latches to the convenience of the vehicle operator and occupants, means are provided in the circuit which tend to stabilize the operation of the latches in the presence of voltage fluctuations which might improperly turn on or turn off one of the latches.

A more complete understanding of the present invention may be had from the following detailed description which should be taken in conjunction with the drawings in which:

FIG. 1 is a block diagram of the integrated circuit of the present invention and its connection with the starter and seat belt warning circuits of the vehicle;

Figure 2A:
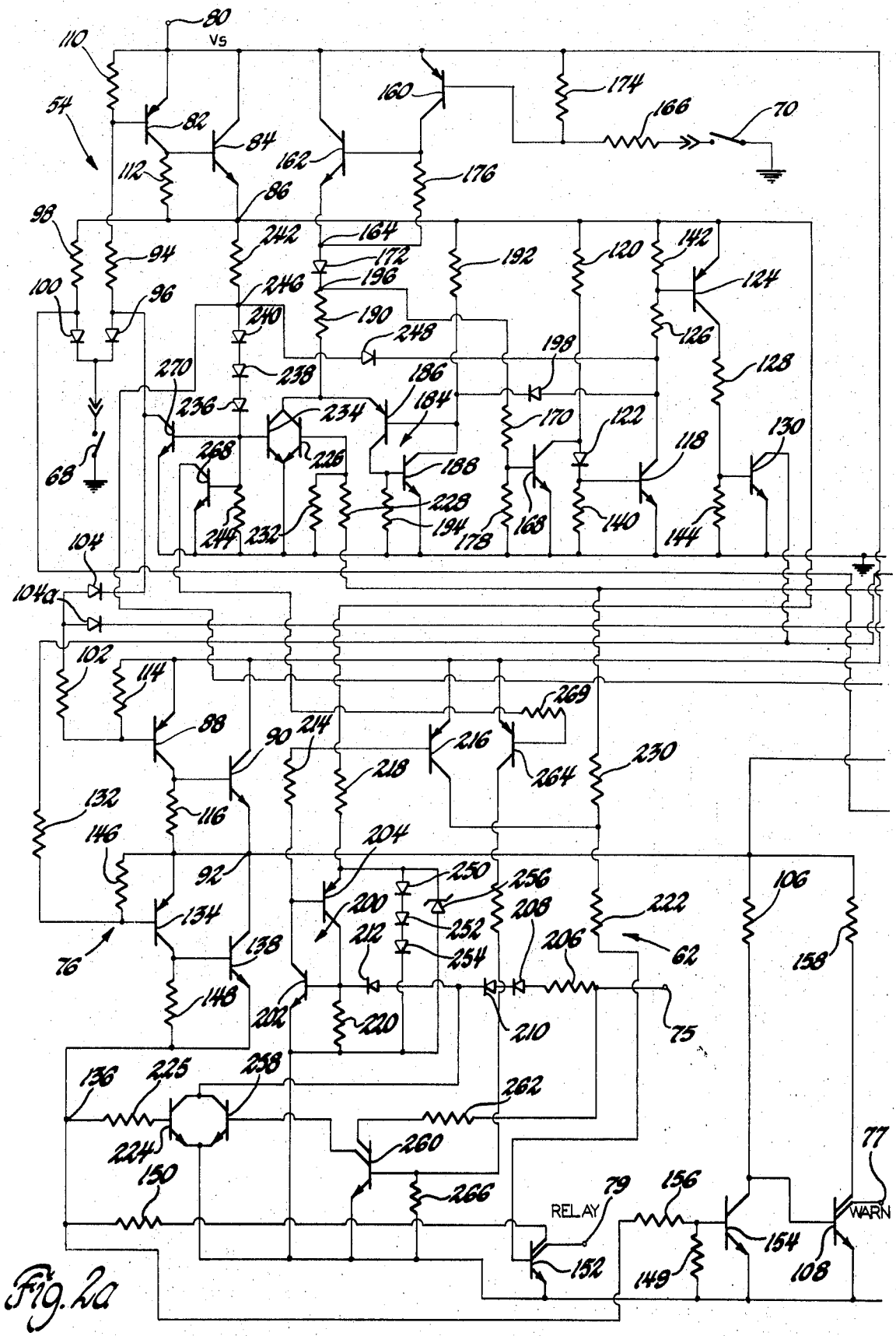
FIGS. 2a and 2b are detailed schematic diagrams of the integrated circuit of the present invention.

Referring now to the drawings and initially to FIG. 1, the numeral 10 designates the vehicle battery which has its negative terminal grounded. A lamp 12 and a buzzer 14 are connected to the positive terminal of the battery 10 through a conventional ignition switch 16 which is schematically represented as two separate switches 18 and 20 designated RUN and START. The lamp 12 and buzzer 14 are connected to ground through transistors 22 and 24 and resistor 26 connected in a Darlington configuration. A diode 28 is provided across the transistor 24 for negative spike suppression. The ignition switch 16 is movable from the OFF position shown to the RUN position closing the switch 18 and may subsequently be moved from the RUN position to a START position closing the switch 20 while maintaining the switch 18 in a closed position. The switch 16 is biased to return to the RUN position opening the switch 16 upon release of the ignition switch 16. A signal at the base of transistor 22 is designated WARN and if positive at the time of closure of the switch 20, will cause the lamp 12 and buzzer 14 to be energized. The switch 20 is shunted by the usual transmission selector switch 30 which closes whenever the transmission selector is placed in a forward drive position. Thus, the lamp 12 and buzzer 14 may be energized upon movement of the ignition switch 16 to the START position or while the ignition switch 16 is in the RUN position and the transmission is in a DRIVE position.

The vehicle starter solenoid 32 is connected with the start switch 20 through a PARK/NEUTRAL switch 34 which is closed when the transmission selector is in either the PARK or NEUTRAL position and is otherwise open. An interrupt relay 36 includes a relay coil 38 which operates normally closed contacts 40 connected in the starter solenoid circuit. The relay coil 38 is connected between the switch 18 and ground through Darlington connected transistors 42 and 44, resistor 46 and diode 48. A 24 volt zener diode 50 is provided for overvoltage protection. The signal at the base of transistor 42 is designated RELAY and if positive at the time of closure of the switch 18 causes the relay 38 to be energized thereby opening the contacts 40 and preventing energization of the starter solenoid 32.

The bipolar integrated circuit of the present invention is generally designated 52 and controls the level of the WARN and RELAY signals. The circuit 52 comprises a driver's sequence latch circuit 54 and a passenger sequence latch circuit 56 which are connected with the positive terminal of the battery 10 through a voltage dropping resistor 58 and to ground through a filter capacitor 60. The voltage applied to the circuits 54 and 56 is designated $V_s$. The integrated circuit 52 further includes a good start latch circuit generally designated 62 having an input designated START which is connected with the switch 20 through a voltage dropping resistor 64 and to ground through a filter capacitor 66. The driver's sequence latch circuit 54 is connected to ground through a normally open seat occupancy responsive switch 68 and a normally open seat belt usage responsive switch 70. The switch 70 may be located so as to close in response to fastening of the seat belts or in response to extending the seat belt from a seat belt reel. The passenger's sequence latch circuit 56 is similarly connected to ground through a normally open seat switch 72 responsive to passenger seat occupancy and a normally open seat belt switch 74 responsive to usage of the seat belts by the passenger of the vehicle. The output of the circuits 54 and 56 provide inputs to a violation detection circuit 76 which provides the output designated WARN and RELAY. If the seat belts are not being used or if they are being used improperly the outputs of the circuit 76 go high to permit energization of the indicators 12 and 14 and the interrupt relay 38. The circuit 76 also provides an input which disables the good start latch circuit 62 if the seat belts are not being used or are being used improperly. If no violation is detected the good start circuit 62 is enabled upon closure of the start switch 20 and provides an output which inhibits the driver and passenger sequence detection circuits 54 and 56. A seat bounce protection circuit generally designated 78 responds to opening of the seat switches 68 and 72 to disable the circuits 54 and 56 after a predetermined lapsed time. Because of the time delay associated with the circuit 78, momentary opening of the seat switches 68 or 72 does not affect the circuits 54 and 56. However, a delay such as that associated with actual departure from the vehicle is effective to disable the circuits 54 and 56. The circuits 54 and 56 are enabled only when their respective seat switches 68 and 72 are closed. The circuits 76 and 78 are enabled by closure of either of the seat switches 68 or 72. The circuit 62 is enabled only in response to closure of the driver's seat switch 68.

The inputs to the integrated circuit 52 from the vehicle includes the supply voltage $V_s$, the seat switches 68 and 72, the belt switches 70 and 74, and the START signal at the input terminal 75. The outputs of the circuit 52 are the WARN signal at the output terminal 77 and the RELAY signal at the output terminal 79.

Referring now to FIG. 2a, the driver sequence detection circuitry 54 includes input switching transistors 82 an 84 for connecting the supply voltage $V_s$ at input terminal 80 to a junction 86 in response to occupancy of the driver's seat. Similarly, the violation detection circuitry 76 includes input transistors 88 and 90 for connecting the supply voltage $V_s$ to a junction 92 in response to occupancy of the driver's seat. The base-emitter junction of the transistor 82 is connected between $V_s$ and ground through the driver's seat switch 68, current limiting resistor 94 and steering diode 96. The base-emitter junction of the transistor 84 is connected between the collector of transistor 82 and ground through the switch 68, current limiting resistor 98 and steering diode 100. The emitter-base junction of the transistor 88 is connected between $V_s$ and ground through the seat switch 68, current limiting resistor 102, steering diode 104, and the diode 96. The base-emitter junction of the transistor 90 is connected between the collector of transistor 88 and ground through a current limiting resistor 106 and the base-emitter junction of a transistor 108. Bleed resistors 110, 112, 114 and 116 are provided across the base-emitter junctions of the transistors 82, 84, 88 and 90 respectively. The transistors 82 and 88 are thus driven to saturation upon closure of the seat switch 68 and in turn drive the transistors 84 and 90 to saturation to apply substantially $V_s$ to the junctions 86 and 92.

A transistor 118 has its emitter-base junction connected between ground and the junction 86 through current limiting resistor 120 and voltage dropping diode 122. The collector of transistor 118 is connected to the junction 86 through the base-emitter junction of a transistor 124 and a current limiting resistor 126. The collector of transistor 124 is connected to ground through a current limiting resistor 128 and the base-emitter junction of a transistor 130. The collector of transistor 130 is connected with the junction 92 through a current limiting resistor 132 and the base-emitter junction of a transistor 134. The collector of transistor 134 is connected to a junction 136 through the base-emitter junction of a transistor 138 and thence to ground through a current limiting resistor 156 and the base-emitter junction of a transistor 154. Bleed resistors 140, 142, 144, 146, 148 and 149 are connected across the base-emitter junctions of the transistors 118, 124, 130, 134, 138 and 154 respectively. The transistors 118, 124, 130, 134, 138 and 154 are thus driven to saturation upon application of the voltage $V_s$ to the junctions 86 and 92 by closure of the driver's seat switch 68 to apply substantially $V_s$ to the junction 136. The junction 136 is also connected with the output terminal 79 through current limiting resistor 150 and the collector-quasi-collector pocket of a transistor 152. The junction 92 is connected with the output terminal 77 through a current limiting resistor 158 and the collector-quasi-collector pocket of the transistor 108. With voltage applied at the output terminals 77 and 79 the transistors 22, 24 and 42, 44 will be driven to saturation upon movement of the ignition switch 16 to the START position. Consequently, closure of the ignition switch 16 immediately after seat occupancy will energize the indicators 12 and 14 and the relay 38 to thereby prevent starting of the vehicle and inform the driver that the seat belts should be fastened.

The circuitry 54 also includes input switching transistors 160 and 162 for connecting supply voltage $V_s$ to a junction 164 in response to fastening of the driver's seat belt. The emitter-base junction of the transistor 160 is connected between $V_s$ and ground through the driver's belt switch 70 and a current limiting resistor 166. The emitter-base junction of the transistor 162 is connected between the collector of transistor 160 and ground through the emitter-base junction of a transistor 168, a current limiting resistor 170, and a voltage dropping diode 172. The collector of transistor 162 is connected with $V_s$ and the collector of transistor 168 is connected between the resistor 120 and the diode 122. Bleed resistors 174, 176, and 178 are connected across the base-emitter junction of the transistors 160, 162, and 168 respectively. The transistors 160 and 162 are thus driven to saturation upon closure of the belt switch 70 to forward bias the transistor 168 to saturation. Conduction of the transistor 168 diverts drive current from the transistor 118 rendering it nonconductive which in turn renders the transistors 124, 130, 134 and 138 nonconductive thereby lowering the voltage at the junction 136 and output terminal 79 to substantially ground potential. When the potential at the terminal 79 drops the transistors 42 and 44 are rendered nonconductive. Also, the drop in voltage at junction 136 removes base drive from the transistor 154 rendering it nonconductive which forward biases the transistor 108 to saturation which in turn lowers the voltage at terminal 77 to substantially ground potential and diverts drive current from the transistors 22 and 24. With the transistors 22, 24, 42 and 44 nonconductive neither the interrupt relay 38 nor the indicators 12 and 14 may be energized, and accordingly, the vehicle may be started.

It will be apparent from the circuitry thus far described that closure of the belt switch 70 overrides the seat switch 68 and it is immaterial whether the belt switch 70 is closed prior to or subsequent to closure of the seat switch 68. If the belt switch 70 is closed first the transistor 118 cannot be turned on and if the belt switch 70 is closed after the seat switch 68 the transistor 118 is turned off. In either event, the voltage at the junction 136 will drop to substantially ground potential, reverse biasing the transistors 22, 24, 42 and 44. Thus, while the circuitry so far described will detect an unfastened seat belt, a seat belt which is maintained in a fastened condition on the seat at all times and therefore of no protective value would not be detected. Since this would defeat the purpose of the seat belts, the circuit 54 further includes a latch 184, the function of which is to detect and remember whether the seat belt switch 70 was closed at the time the driver's seat was occupied and if so to drive the transistor 124 to saturation to produce the violation signal at the junction 136.

Latch 184 comprises a PNP transistor 186 and an NPN transistor 188 regeneratively coupled thereto. The emitter of transistor 186 is connected with the junction 164 through a current limiting resistor 190 and the diode 172, while the base of the transistor 186 is connected with the junction 86 through a current limiting resistor 192. The collector of transistor 186 is connected to ground through the base-emitter junction of the transistor 188. The collector of transistor 188 is connected with the junction 164 through the base-emitter junction of the transistor 186. A bleed resistor 194 is provided across the base-emitter junction of the transistor 188. The latch 184 may be rendered conductive by raising the voltage at the emitter of the transistor 186 positive with respect to the voltage at the base of the transistor 186 by an amount greater than the typical .6 volt drop across the emitter-base junction of the transistor 186. If the seat belts are fastened on the seat prior to seat occupancy the belt switch 70 will be closed and the seat switch 68 will be opened. Accordingly, the transistor 186 is driven to saturation by the voltage applied to the junction 164. Upon conduction of the transistor 186 the transistor 188 is driven to saturation to apply substantially ground potential to the base of the transistor 186 so that upon occupancy of the seat, and closure of the seat switch 68, the voltage applied at the junction 86 does not affect the condition of the latch 184. The collector of transistor 188 is connected with the collector of transistor 118 through a steering diode 198 so that conduction of the latch 184 provides a ground path from the base of transistor 124 which is independent of the ground path provided by the transistor 118. Conduction of the latch 184 thus renders the transistor 124 conductive upon closure of the seat switch 68 even though the transistor 118 is held in a nonconductive state by the transistor 168. As previously indicated the transistor 124 drives the transistors 130, 134 and 138 to saturation to produce the violation signal at the junction 136 which will prevent vehicle starting and permit energization of the warning devices.

The latch 184 may be held in a nonconductive state by reverse biasing the base-emitter junction of the transistor 186. Thus, if the seat switch 68 is closed prior to closure of the belt switch 70 the voltage at the junction 86 will be applied to the base of the transistor 186. The voltage at a junction 196 will be lower than that at the junction 86 by the drop across the diode 172 so that the emitter of the transistor 186 will be at a lower voltage than the base of the transistor 186 to maintain the transistor 186 in a nonconductive state.

The good start latch circuit 62 comprises a latch 200 which includes an NPN transistor 202 and a PNP transistor 204 regeneratively coupled thereto. The emitter-base junction of the transistor 202 is connected between ground and the input terminal 75 through current limiting resistor 206 and voltage dropping diodes 208, 210, and 212. Voltage is applied to the input terminal 75 upon movement of the ignition switch 16 to the START position closing the switch 20. The collector of the transistor 202 is connected to $V_s$ through a current limiting resistor 214 and the base-emitter junction of a transistor 216. The emitter-base junction of the transistor 204 is connected between the collector of transistor 202 and the junction 86 through a current limiting resistor 218. The collector of transistor 204 is connected to ground through the base-emitter junction of transistor 202. A bleed resistor 220 is connected across the base-emitter junction of the transistor 202. The transistor 202 may be rendered conductive by the application of sufficient voltage to the base thereof. Upon saturation of the transistor 202 the base of the transistor 204 is lowered sufficiently to drive the transistor 204 to saturation which connects the base of the transistor 202 with the junction 86 to maintain the latch 200 in a conductive state as long as the seat switch 68 remains closed.

The collector of transistor 216 is connected to ground through a current limiting resistor 222 and the base-emitter junction of the quasi-collector transistor 152. Once the latch 200 is enabled, i.e., driven to a conductive latched state, the transistor 216 is driven to saturation so that the rise in voltage at the junction 136 in the event of a violation subsequent to enablement of the latch 200 saturates the transistor 152 to apply substantially ground potential at the output terminal 79. Consequently, once the latch 200 is enabled the transistors 42, 44 (FIG. 1) are reverse biased and the vehicle may be restarted even if the belt switch 70 is open as long as the seat switch 68 is closed.

A transistor 224 has its collector emitter path connected between ground and the cathode of diode 210. The base of the transistor 224 is connected with the junction 136 through a current limiting resistor 225 so that whenever the voltage at the junction 136 is high, i.e., there is a violation in the driver's seat circuit 54, the transistor 224 is driven to saturation to divert drive current from the transistor 202 and prevent the latch 200 from being driven to a conductive state. Since a violation signal occurs at the junction 136 when the latch 184 is in a latched conductive state it will be apparent that the transistor 224 disables the latch 200 when the latch 184 is enabled.

A transistor 226 functions in a manner similar to the transistor 224 to disable the latch 184, once the latch 200 has been enabled. The collector of transistor 226 is connected with the emitter of transistor 186. The emitter-base junction of the transistor 226 is connected between ground and the collector of transistor 216 through current limiting resistors 228 and 230. A bleed resistor 232 is connected across the emitter-base junction of the transistor 226. Upon conduction of the latch 200 and subsequent saturation of the transistor 216 the transistor 226 will be saturated as long as voltage is applied to the junction 164 thereby substantially grounding the emitter of transistor 186 to reverse bias the emitter-base junction of the transistor 186.

It will be understood from the above that proper operation of the circuit is highly dependent on the stability of the latches 184 and 200. In the automobile environment large fluctuations of the supply voltage $V_s$ and other voltage transients or noise may be introduced into the circuit which could affect the condition of the latches 184 and 200. For example, it is well known that battery voltage fluctuates substantially during starting of the vehicle and may even drop below the four volts necessary for maintaining the input switching transistors 82, 84, 88, 90, 160 and 162 in saturation. Should the transistors 84 and 162 be rendered only partially conductive or nonconductive as a result in a drop in the voltage $V_s$ during starting, it is possible that as the voltage $V_s$ returns to normal potential, the transistors 84 and 162 will be driven to saturation in a sequence different from that initially establishing the condition of the latch 184. This could result in an energization of the lamp 12 and buzzer 14 even though the switches 68 and 70 have been closed in the proper sequence prior to starting of the vehicle. Similarly, the latch 200 might be turned off as a result of a voltage drop at the junction 86 thereby losing the restart capability provided by the latch 200. In addition, voltage transients such as those produced by the buzzer 14 may affect the condition of the latches 184 and 200. Various measures which we have shown experimentally to be effective in maintaining the latches 184 and 200 in the state to which they are initially set at the time of starting the vehicle are discussed hereinafter.

The voltage transient protection means in the driver sequence detection circuit 54 includes the diode 172 which lowers the potential at the emitter of the transistor 186 relative to the potential at the base of the transistor 186. In addition, a transistor 234 is provided for substantially grounding the emitter of the transistor 186 if the seat is occupied at the time the seat belt is fastened. The emitter-base junction of the transistor 234 is connected between ground and the junction 86 through clamping diodes 236, 238, 240 and current limiting resistor 242. The collector of transistor 234 is connected with the junction 164 through the diode 172 and resistor 190. A bleed resistor 244 is connected across the base-emitter junction of the transistor 234. The junction 246 at the anode of the diode 240 is connected with the collector of the transistor 188 through a voltage dropping diode 248 and the steering diode 198. Closure of the belt switch 70 subsequent to closure of the seat switch 68 drives the transistor 234 to saturation to lower the voltage at the emitter of transistor 186 to substantially ground potential. On the other hand, if the belt switch 70 is closed while the seat switch 68 is open the latch 184 is rendered conductive so that upon closure of the seat switch 68 the voltage at the junction 246 is at a positive potential equal to the voltage drop across the diodes 248 and 198 and the saturation voltage of the transistor 188. The voltage at the junction 246, when the transistor 188 is saturated, is less than that required to saturate transistor 234 due to the forward biasing requirements of the diode 236, 238 and 240 so that the transistor 234 is maintained in a nonconductive state.

As previously indicated, closure of the seat switch 68 applies voltage to the emitter of transistor 204 of the latch 200. To prevent mere occupancy of the driver's seat from switching the latch 200 to a conductive state, a string of diodes 250, 252 and 254 connected between the emitter of transistor 204 and ground, clamp the emitter of transistor 204 at a potential which reverse biases the emitter-base junction thereof. The diodes 250, 252 and 254 insure that the transistor 202 must be driven to saturation before the transistor 204 will be forward biased. In addition, a substrate zener diode 256 is connected between the emitter of transistor 204 and ground to prevent negative transients from switching the latch to a conductive state. The diode 212 in contrast with the other diodes in the circuit is a collector-base diode which requires that substantially more current be applied to the anode of the diode 212 than would normally be required to saturate the transistor 202 because of the substantial substrate current leakage associated with a collector-base diode. The bleed resistor 220 has a degenerative effect which reduces the gain of the latch 200 thereby further increasing the drive current requirement at the base of the transistor 202 in order to drive the latch 200 to saturation. The diode 212 further performs the function of isolating the collector of transistor 204 from the ground path established by saturation of the transistor 224 in response to a violation signal at the junction 136. Thus, while the transistor 224 prevents conduction of the latch 200 if a violation has been detected prior to an attempt to start the vehicle, a violation which occurs after the vehicle has been started does not affect the latch 200 because the diode 212 isolates the ground path through the transistor 224 from the base of transistor 202.

It will be noted that the input terminal 75 is high with the ignition switch 16 in the RUN position and the transmission selector in the drive position. This is necessary, of course, in order to provide voltage to the indicators 12 and 14 to provide a warning should the seat belts be unfastened after the vehicle has been started. Nevertheless, this arrangement permits application of the voltage to the input terminal 75 prior to movement of the ignition switch 16 to the START position. With voltage supplied to the junction 75, a race condition is established, upon closure of the seat switch 68, which may result in the latch 200 being driven to a conductive state prior to saturation of the transistor 224 thus permitting the starting of the vehicle with the seat belts in an unfastened condition. To eliminate this possibility a transistor 258 is provided for grounding the cathode of diode 210 if voltage is applied to the input terminal 75 prior to seat occupancy. The emitter-base junction of the transistor 258 is connected between ground and the input terminal 75 through the collector-quasi-collector pocket of a transistor 260 and a current limiting resistor 262. The transistor 258 is accordingly driven to saturation when voltage appears at the input terminal 75 as long as the transistor 260 is in a nonconductive state. The emitter-base junction of the transistor 260 is connected between ground and the collector of a transistor 264. A bleed resistor 266 is connected across the base-emitter junction of the transistor 260. The base-emitter junction of the transistor 264 is connected between $V_s$ and the collector of a transistor 268 through a current limiting resistor 269. The emitter-base junction of the transistor 268 is connected between ground and the junction 86 through the diodes 236, 238, 240, and the current limiting resistor 242. The voltage at the base of transistor 268 is the same as that of the base of transistor 234 so that the transistor 268 operates in the same fashion as the transistor 234, that is to say the transistor 268 is maintained in a cut-off condition unless both the seat switch 68 and the belt switch 70 are closed and the seat switch 68 closes prior to the belt switch 70. This is because the voltage at the junction 246 is insufficient to drive the transistor 268 to saturation if the latch 184 is conductive. When the transistor 268 conducts the transistor 264 is saturated which in turn saturates the transistor 260 diverting base drive from the transistor 258. Thus, the latch 200 is disabled until the driver is seated and has properly fastened his seat belt.

Figure 2B:
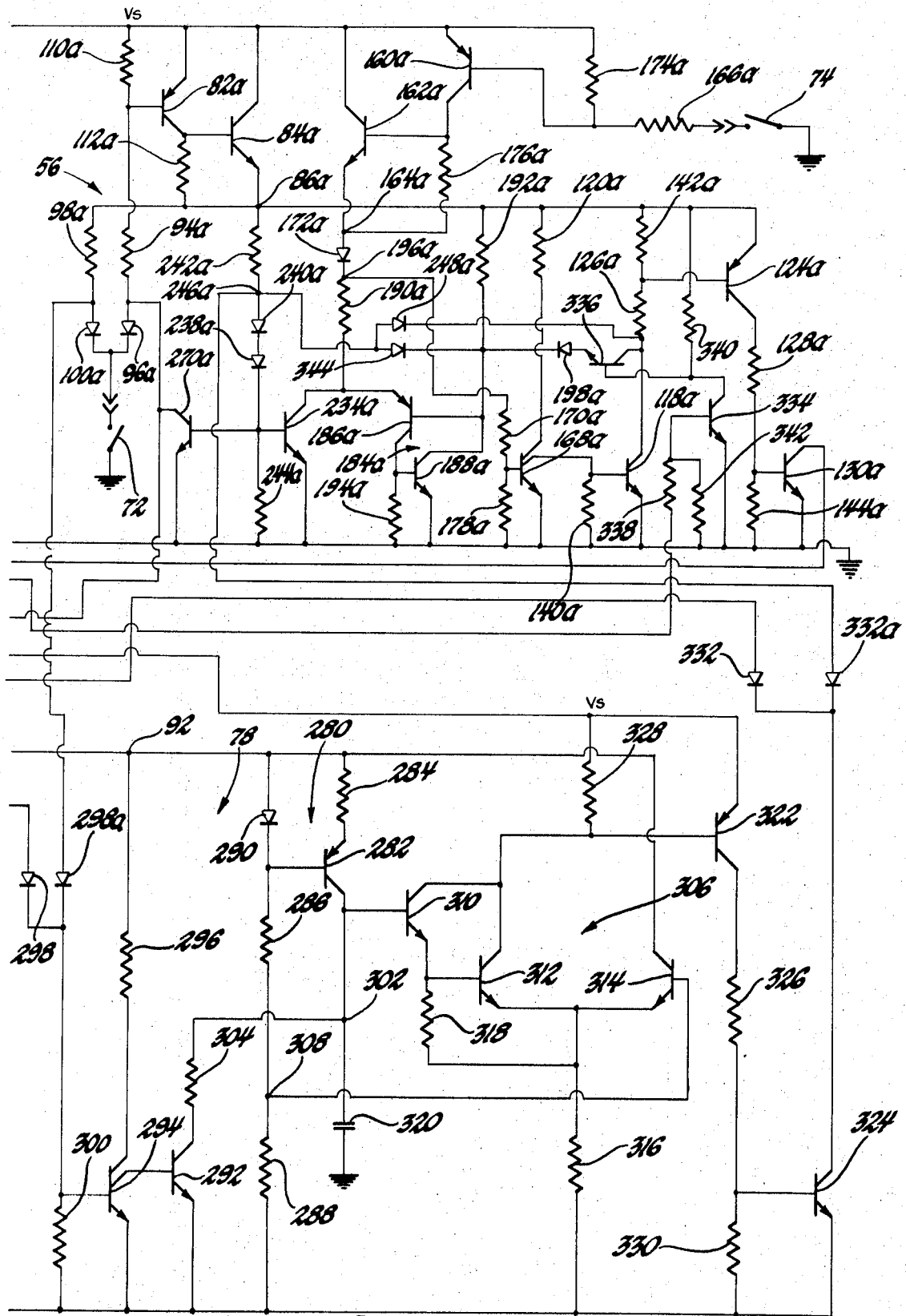

Before discussing the details of the seat bounce protection circuitry 78 shown in FIG. 2b, it should first be noted that a transistor 270 has its emitter-base junction connected between ground and the junction 86 and its collector connected with $V_s$ through the emitter-base junction of the transistor 82 and current limiting resistor 94. Consequently, the transistor 270 is driven to saturation simultaneously with the transistor 234, i.e. upon sequential closure of the seat switch 68 and belt switch 70 as explained earlier in connection with transistor 234. Once the transistor 270 is driven to saturation it provides a ground path for maintaining the transistors 82 and 84 saturated so that the potential of the junction 86 is not lost by momentary opening of the switch 68. As will be shown in connection with FIG. 2b, an opening of the switch 68 of a sufficient duration indicative of something other than normal seat bounce, as for example, when the occupant leaves the vehicle, will cause the voltage at the junction 246 to drop and render the transistor 270 nonconductive to remove the voltage at the junctions 86 and 92.

Referring now to FIG. 2b, the seat bounce protection circuitry 78 includes a constant current source 280 connected between the junction 92 and ground. The source 280 comprises a transistor 282, a current limiting resistor 284, voltage dividing resistors 286, 288, and a diode 290. A transistor 292 has its emitter-base junction connected between ground and the junction 92 through the collector-quasi-collector pocket of a transistor 294 and a current limiting resistor 296. The emitter-base junction of the transistor 294 is connected between ground and the seat switch 68 through a diode 298 and the diode 100. A bleed resistor 300 is connected across the emitter-base junction of the transistor 294. The collector of transistor 292 is connected with a junction 302 through a resistor 304. As long as the seat switch 68 is closed the transistor 294 is reverse biased and the transistor 292 is driven to saturation. A differential detector 306 is provided for sensing the voltage differential at the junctions 302 and the junction 308. The detector 306 comprises transistors 310, 312, 314, common emitter resistor 316 and bleed resistor 318. The base of the transistor 312 is connected with the junction 302 through the emitter-base junction of the transistor 310 while the base of the transistor 314 is connected with the junction 308. A timing capacitor 320 is connected between ground and the junction 302. The collectors of transistors 310 and 312 are connected with $V_s$ through the emitter-base junction of a transistor 322 while the collector of transistor 314 is connected with the junction 92. The collector of transistor 322 is connected to ground through the base-emitter junction of a transistor 324 and a current limiting resistor 326. Bleed resistors 328 and 330 are connected across the emitter-base junctions of the transistors 322 and 324. As long as the transistor 292 is in a saturated condition the voltage at the junction 308 is positive with respect to the voltage at the junction 302 which drives the transistor 314 to saturation which in turn holds the transistors 312 and 310 at cut off. If the seat switch 68 opens the voltage to the base of transistor 294 rises to substantially $V_s$ driving the transistor 294 to saturation and diverting drive current from the transistor 292 rendering the transistor 292 nonconductive. With the transistor 292 cut off the capacitor 320 begins to charge from the constant current source 280. When the voltage at the junction 302 goes positive with respect to the voltage at the junction 308 the transistors 310 and 312 are forward biased to saturation and the transistor 314 is driven to cut-off thereby providing drive current to the transistor 322. When the detector 306 switches states, the transistors 322 and 324 are driven to saturation which applies substantially ground potential to the junction 246 (FIG. 2a) through a steering diode 322. The transistor 270 (FIG. 2a) is rendered nonconductive thereby removing voltage from the junctions 86 and 92. If the seat switch 68 recloses before the capacitor 320 charges to a voltage sufficient to switch the state of the detector 306 the transistor 294 is cut off and the transistor 292 is driven to saturation to discharge the capacitor 320.

The passenger sequence detection circuitry 56 is similar in most respects to the driver's circuit 54 and corresponding components are designated by the subscript a. The diodes 104a, 298a, and 332a interconnect the passenger's seat switch 72 with the violation detection circuitry 76 and the seat bounce protection circuit 78. While the passenger sequence detection circuit 56 could be identical with the driver's circuit 54, certain differences have been incorporated to provide slightly differing functions. For example, transistors 334 and 336 have been added to the circuit 56 and are responsive to conduction of the latch 200 to break the circuit between the sequence latch 184a and the base of transistor 124a once the vehicle has been started. The emitter-base junction of the transistor 334 is connected between ground and the collector of transistor 216 through a current limiting resistor 338 and the resistor 230. The emitter-base junction of the transistor 336 is connected between the steering diode 198a and the junction 86a through a current limiting resistor 340. The collector of transistor 334 is connected with a base of transistor 336 and the collector of transistor 336 is connected with the base of transistor 124a through the resistor 126a. A bleed resistor 342 is connected across the emitter-base junction of the transistor 334. Prior to starting of the vehicle the passenger sequence detection circuitry 56 operates in the same fashion as the driver's circuit 54 since the transistor 336 will be driven to saturation upon conduction of the latch 184a to complete a path between the latch 184a and the base of transistor 124a. However, once the vehicle has been started the transistor 334 is driven to saturation to divert drive current from the transistor 336 and hold it at cut-off. The transistors 334 and 336 have been added to the passenger circuit 56 to overcome a problem which has been found to exist when a small child is seated in the passenger's position. It has been noted that even though the small child may be properly fastened in the seat, movement of the child may cause the seat switch 70 to open for a duration sufficient for the capacitor 320 to charge and effect removal of voltage from the junction 86a. While such suction will not remove voltage from the junction 86 and 92 due to the driver's seat switch 68 being closed, it will effect upon reclosure of the passenger's seat switch 72 a driving of the sequence latch 184a to a conductive state since the seat switch 72 would be closing while the belt switch 74 was already closed. Without the transistor 334 and 336 the transistor 124a would be driven to saturation causing energization of the warning indicators 12 and 14. However, with the transistor 336 open circuiting the ground path between the latch 184a and the transistor 124a after the vehicle has been started this problem is overcome. A diode 344 has been added to maintain the connection between the junction 246a and the latch 184a. Since the diode 344 shunts the path previously provided by the diodes 248a and 198a the diode 236 in the passenger circuit 54 has been eliminated from the base circuit of the transistor 234a to reestablish the proper voltage at the base of the transistor 234a. Another minor difference is that the transistor 168 and diode 122 of the driver's circuit 54 has been replaced by a transistor 344 having a quasi-collector connected with the base of transistor 118a.

Having thus described our invention what we claim is:

1. An integrated circuit for providing a seat belt violation signal for controlling a load device on a motor vehicle said vehicle including a battery, a seat and seat switch means adapted to be actuated in response to seat occupancy, seat belts, and belt switch means adapted to be actuated in response to usage of said belts, said integrated circuit being characterized by relatively high immunity to voltage fluctuations and comprising:

means for connecting said battery to a first junction in said circuit in response to actuation of said seat switch means, means for connecting said battery to a second junction in said circuit in response to actuation of said seat belt switch means, latch means comprising a PNP transistor and an NPN transistor, means connecting the base of said PNP transistor with said first junction, means including a voltage dropping diode connecting the emitter of said PNP transistor to said second junction, means connecting the collector of said PNP transistor with the base of said NPN transistor, means connecting the emitter of said NPN transistor to ground and means connecting the collector of said NPN transistor to the base of said PNP transistor whereby said latch means is driven to a latched conductive state in response to actuation of said seat belt switch means prior to actuation of said seat switch means, and said latch means is maintained in an unlatched nonconductive state in response to actuation of said seat switch means prior to actuation of said seat belt switch means, a second NPN transistor having its emitter connected to ground and its collector connected with the emitter of said PNP transistor, resistor means connecting said first junction to a third junction, first and second parallel diode networks respectively connecting the base of said second NPN transistor and the base of said PNP transistor to said third junction, said first diode network including at least one more diode than the number of diodes in said second diode network whereby the voltage at said third junction is sufficient to saturate said second NPN transistor and substantially ground the emitter of said PNP transistor when said belt switch means is actuated subsequent to actuation of said seat switch means and whereby the voltage at said third junction is insufficient to render said second NPN transistor conductive in response to actuation of said seat switch means subsequent to actuation of said belt switch means due to conduction of said latch means, output transistor switch means for producing said violation signal in response to conduction of said latch means.

2. An integrated circuit for providing a seat belt violation signal for controlling a load device on a motor vehicle, said vehicle including a battery, a seat and seat switch means adapted to be actuated in response to seat occupancy, seat belts and belt switch means adapted to be actuated in response to usage of said belts, said integrated circuit comprising:

means for connecting said battery to a first junction in said circuit in response to actuation of said seat switch means, means for connecting said battery to a second junction in said circuit in response to actuation of said seat belt switch means, latch means comprising a PNP transistor and an NPN transistor, means connecting the base of said PNP transistor with said first junction, means connecting the collector of said PNP transistor with the base of said NPN transistor, means connecting the emitter of said NPN transistor to ground and means connecting the collector of said NPN transistor to the base of said PNP transistor, means connecting the emitter of said PNP transistor to said second junction, whereby said latch means is driven to a latched conductive state in response to actuation of said seat belt switch means prior to actuation of said seat switch means and said latch means is maintained in an unlatched nonconductive state in response to actuation of said seat switch means prior to actuation of said seat belt switch means, circuit means for rendering said latch means relatively immune to voltage fluctuations at said first and second junctions and including a voltage dropping diode connected in series with the emitter of said PNP transistor, a second NPN transistor having its emitter connected to ground and its collector connected with the emitter of said PNP transistor, means including a resistor and a first series diode network connecting the base of said second NPN transistor to said first junction, a second diode network connected between the base of said PNP transistor and a third junction between said resistor means and said first diode network, said first diode network including at least one more diode then the number of diodes in said second diode network whereby the voltage at said third junction is sufficient to saturate said second NPN transistor and substantially ground the emitter of said PNP transistor when said belt switch means is actuated subsequent to actuation of said seat switch means and whereby the voltage at said third junction is insufficient to render said second NPN transistor conductive in response to actuation of said seat switch means subsequent to actuation of said belt switch means due to conduction of said latch means, a third NPN transistor having its emitter collector path in parallel with said seat switch means and its base connected with said third junction through said first diode network whereby said third NPN transistor is rendered conductive in response to actuation of said seat belt switch means subsequent to actuation of said seat switch means to maintain the voltage at said first junction despite momentary deactuation of said seat switch means, means including a timing capacitor responsive to deactuation of said seat switch means for a predetermined time for lowering the voltage at said third junction and rendering said third NPN transistor nonconductive.

3. An integrated circuit for providing a seat belt violation signal for controlling a starter circuit interrupt relay on a motor vehicle, said vehicle including a battery, a seat and seat switch means responsive to seat occupancy, seat belts and switch means responsive to usage of said belts, said integrated circuit being characterized by relatively high immunity to voltage fluctuation and comprising:

a first control transistor, means for connecting said battery to said first control transistor to drive said first control transistor to saturation upon actuation of said seat switch means, output transistor switch means for producing said violation signal in response to saturation of said first control transistor, a second control transistor, means for connecting said battery to said second control transistor to drive said second control transistor to saturation and divert drive current from said first control transistor in response to actuation of said belt switch means, latch means comprising a PNP transistor and an NPN transistor, means regeneratively coupling said PNP and said NPN transistors, means connecting the base of said PNP transistor to said battery in response to actuation of said seat switch means, means including a voltage dropping diode connecting the emitter of said PNP transistor to said battery in response to actuation of said belt switch means whereby said latch means is driven to a conductive latched state in response to actuation of said belt switch means prior to actuation of said seat switch means and said latch means is maintained in a nonconductive unlatched state in response to actuation of said seat switch means prior to actuation of said belt switch means, means connecting said latch means in parallel with said first control transistor whereby said output transistor switch means produces said violation signal in response to conduction of either said first control transistor or said latch means, a second NPN transistor, means connecting the emitter of said PNP transistor to ground through the emitter collector path of said second NPN transistor means responsive to the state of said latch means for driving said second NPN transistor to saturation if said latch means is in a nonconductive state after actuation of both said seat switch means and said belt switch means.

4. An integrated circuit for providing a seat belt violation signal for controlling a starter circuit interrupt relay on a motor vehicle, said vehicle including a battery, a seat and seat switch means responsive to seat occupancy, seat belts and switch means responsive to usage of said belts, said integrated circuit comprising:

a first control transistor, means for connecting said battery to said first control transistor to drive said first control transistor to saturation upon actuation of said seat switch means, output transistor switch means for producing said violation signal in response to saturation of said first control transistor, a second control transistor, means for connecting said battery to said second control transistor to drive said second control transistor to saturation and divert drive current from said first control transistor in response to actuation of said belt switch means, first latch means comprising a PNP transistor and an NPN transistor, means regeneratively coupling said PNP and said NPN transistors, means connecting the base of said PNP transistor to said battery in response to actuation of said seat switch means, means connecting the emitter of said PNP transistor to said battery in response to actuation of said belt switch means whereby said first latch means is driven to a conductive latched state in response to actuation of said seat belt switch means prior to actuation of said seat switch means and said latch is maintained in a nonconductive unlatched state in response to actuation of said seat switch means prior to actuation of said belt switch means, means connecting said first latch means in parallel with said first control transistor whereby said output transistor switch means produces a violation signal in response to conduction of either said first control transistor or said first latch means, circuit means for stabilizing the operation of said first latch means in the presence of voltage fluctuations in said circuit comprising a voltage dropping diode connected in series with the emitter of said PNP transistor, a second NPN transistor, means connecting the emitter of said PNP transistor to ground through the emitter collector path of said second NPN transistor, means responsive to the state of said latch for driving said second NPN transistor to saturation if said latch means is in a nonconductive state after actuation of both of said seat switch means and said belt switch means, second latch means adapted to be driven to a conductive latched state in response to movement of the vehicle ignition switch to a Start position in the absence of said violation signal, and means responsive to conduction of said second latch means for disconnecting said first latch means from said output transistor switch means.

5. An integrated circuit for providing a seat belt violation signal for controlling an indicator on a motor vehicle, said vehicle including a battery, a seat and switch means responsive to seat occupancy, seat belts and switch means responsive to usage of said belts, said integrated circuit comprising:

first input transistor switch means for connecting said battery to a first junction in said circuit in response to actuation of said seat switch means, second input transistor switch means for connecting said battery to a second junction in said circuit in response to actuation of said seat belt switch means, output transistor switch means, a first control transistor, means connecting said first control transistor to said first junction to provide drive current to said first control transistor, means interconnecting said first control transistor with an output transistor switch means to provide said violation signal upon conduction of said first control transistor, a second control transistor, means connecting said second control transistor to said second junction to provide drive current to said second control transistor, means interconnecting said first and second control transistor to divert drive current from said first control transistor upon conduction of said second control transistor to thereby render said first control transistor nonconductive, latch means comprising a PNP transistor and an NPN transistor, means connecting the base of said PNP transistor with said first junction, means connecting the emitter of said PNP transistor to said second junction whereby said PNP transistor is rendered conductive in response to actuation of said seat belt switch means prior to actuation of said seat switch means and said PNP transistor is reverse biased in response to actuation of said seat switch means prior to actuation of said seat belt switch means, said NPN transistor being coupled to said PNP transistor to be rendered conductive in response to conduction of said PNP transistor and to maintain said PNP transistor in conduction once rendered conductive, means connecting said latch means with said output transistor means to produce said violation signal in response to conduction of said latch means, means for insuring maintenance of the reverse biased condition of said PNP transistor in the presence of voltage fluctuations at said first and second junctions comprising at least one diode connected in series between said second input switch means and the emitter of said PNP transistor, a second NPN transistor, means connecting said second NPN transistor with said latch means and said first junction whereby application of voltage to said first junction prior to application of voltage to said second junction drives said second NPN transistor to saturation to apply substantially ground potential to the emitter of said PNP transistor.

6. In a motor vehicle provided with a battery, a starter solenoid, an ignition switch movable from an Off position to a Start position to energize said solenoid, and relay means responsive to a seat belt violation signal for disconnecting said solenoid from said ignition switch, said vehicle further including seat occupancy responsive switch means and switch means responsive to usage of seat belts provided in said vehicle, an integrated circuit having input terminals for connection with said battery, said seat switch means, said belt switch means, and said ignition switch and an output terminal for connection with said relay means, said circuit comprising:

first latch means including a first NPN transistor and a first PNP transistor, means connecting the base of said PNP transistor to said battery in response to actuation of said seat occupancy responsive switch means, means connecting the collector of said NPN transistor to said battery through the emitter-base junction of said PNP transistor in response to actuation of said seat belt switch means, means connecting the collector of said PNP transistor to ground through the emitter-base junction of said NPN transistor whereby said first NPN and PNP transistors are driven to a latched conductive state to provide said violation signal at said output terminal in response to actuation of said belt switch means prior to actuation of said seat switch means and are reverse biased to an unlatched nonconductive state in response to actuation of said seat switch means prior to actuation of said belt switch means, second latch means including a second NPN transistor and a second PNP transistor, means connecting the collector of said second NPN transistor to said battery through the base-emitter junction of said second PNP transistor in response to actuation of said seat occupancy responsive switch, means connecting the collector of said second PNP transistor to ground through the base-emitter junction of said second NPN transistor, means for connecting the base of said second NPN transistor to said battery in response to movement of said ignition switch to said Start position, first transistor switch means responsive to said violation signal for substantially grounding the base of said second NPN transistor whereby said second NPN and second PNP transistors are driven to a latched conductive state upon movement of said ignition switch to said Start position only in the absence of said violation signal.

7. In a motor vehicle provided with a battery, a starter solenoid, an ignition switch movable from an Off position to a Start position to energize said starter solenoid, and relay means responsive to a seat belt violation signal for disconnecting said solenoid from said ignition switch, said vehicle further including seat occupancy responsive switch means and switch means responsive to usage of seat belts provided in said vehicle, an integrated circuit having input terminals for connection with said battery, said seat switch means, said belt switch means, and said ignition switch and an output terminal for connection with said relay means, said circuit comprising:

first latch means including a first NPN transistor and a first PNP transistor, means connecting the base of said PNP transistor to said battery in response to actuation of said seat occupancy responsive switch means, means connecting the collector of said NPN transistor to said battery through the emitter-base junction of said PNP transistor in response to actuation of said seat belt switch means, means connecting the collector of said PNP transistor to ground through the emitter-base junction of said NPN transistor whereby said first NPN and PNP transistors are driven to a latched conductive state to provide said violation signal at said output terminal in response to actuation of said belt switch means prior to actuation of said seat switch means and are reverse biased to an unlatched nonconductive state in response to actuation of said seat switch means prior to actuation of said belt switch means, second latch means including a second NPN transistor and a second PNP transistor, means connecting the collector of said second NPN transistor to said battery through the base-emitter junction of said second PNP transistor in response to actuation of said seat occupancy responsive switch, means connecting the collector of said second PNP transistor to ground through the base-emitter junction of said second NPN transistor, means for connecting the base of said second NPN transistor to said battery in response to movement of said ignition switch to said Start position, control transistor switch means responsive to seat occupancy and the absence of seat belt usage for providing said violation signal, means including a first switching transistor responsive to the violation signal produced by either said first latch means or said control transistor switch means for diverting drive current from the base of said second NPN transistor upon movement of said ignition switch to said Start position in the presence of said violation signal, a blocking diode connected between said first switching transistor and the collector of said second PNP transistor, means for applying said violation signal to said output terminal, and third transistor switch means responsive to conduction of said second latch means for inhibiting the application of said violation signal to said output terminal.

8. In a motor vehicle provided with a battery, a starter solenoid, an ignition movable from an Off position to a Start position to energize said solenoid, and relay means responsive to a seat belt violation signal or disconnecting said solenoid from said ignition switch, said vehicle further including seat occupancy responsive switch means and switch means responsive to usage of seat belts provided in said vehicle, an integrated circuit having input terminals for connection with said battery, said seat switch means, said belt switch means, and said ignition switch and an output terminal for connection with said relay means, said circuit comprising:

first input transistor switch means for applying said battery potential to a first junction in said circuit in response to actuation of said seat switch means, second input transistor switch means for applying said battery potential to a second junction in said circuit in response to actuation of said seat belt switch means, a first control transistor, means connecting said first control transistor to said first junction whereby said first control transistor is driven to saturation upon actuation of said seat switch means, a second control transistor, means connecting said second control transistor to said second junction whereby said second control transistor is driven to saturation to divert drive current from said first control transistor in response to actuation of said seat belt switch means, latch means comprising a PNP transistor and an NPN transistor, means connecting the base of said PNP transistor with said first junction, means connecting the emitter of the PNP transistor to said second junction, means connecting the collector of said PNP transistor with the base of said NPN transistor, means connecting the emitter of said NPN transistor to ground and means connecting the collector of said NPN transistor to the base of said PNP transistor whereby said latch means is driven to a latched conductive state in response to actuation of said seat belt switch means prior to actuation of said seat switch means, and said latch means is maintained in an unlatched nonconductive state in response to actuation of said seat switch means prior to actuation of said seat belt switch means, circuit means for rendering said first latch means relatively immune to voltage fluctuations and comprising a voltage dropping diode connected in series with the emitter of said PNP transistor, a second NPN transistor having its emitter connected to ground and its collector connected with the emitter of said PNP transistor, resistor means connecting said first junction to a third junction, first and second parallel diode networks respectively connecting the base of said second NPN transistor and the base of said PNP transistor to said third junction, said first diode network including at least one more diode than the number of diodes in said second diode network whereby the voltage at said third junction is sufficient to saturate said second NPN transistor and substantially ground the emitter of said PNP transistor when said seat belt switch means is actuated subsequent to actuation of said seat switch means and whereby the voltage at said third junction is insufficient to render said second NPN transistor conductive in response to actuation of said seat switch means subsequent to actuation of said belt switch means due to conduction of said latch means, controlled output transistor switch means for producing said violation signal in response to saturation of said first control transistor or said first latch means, second latch means including a third NPN transistor and a second PNP transistor, means connecting the collector of said third NPN transistor to the said first junction through the base-emitter junction of said second PNP transistor, and means connecting the collector of said second PNP transistor to ground through the base-emitter junction of said third NPN transistor, circuit means for rendering said second latch means relatively immune to voltage fluctuations and comprising clamping diode means connecting the emitter of said second PNP transistor with the emitter of said third NPN transistor to prevent conduction of said second PNP transistor until said third NPN transistor is driven to saturation, a substrate zener diode connected across said clamping diode means to prevent negative transients from driving said second latch means to conductance, a blocking diode having its cathode connected with the collector of said second PNP transistor and its anode connected to ground through the collector emitter path of a first switching transistor, means connecting the base of said first switching transistor to the output of said controlled transistor switch means, means connecting the anode of said blocking diode to said battery in response to movement of said ignition switch to said Start position, a second switching transistor, means connecting said second switching transistor with said battery in response to closure of said ignition switch to drive said second switching transistor to saturation and substantially ground the anode of said blocking diode, first transistor switch means responsive to seat occupancy and nonconductance of said first latch means for rendering said second switching transistor nonconductive, means connecting the output of said controlled transistor switch means to said output terminal, third transistor switch means responsive to conduction of said second latch means for inhibiting application of said violation signal to said output terminal, fourth transistor switch means responsive to conduction of said second latch means for substantially grounding the emitter of said first PNP transistor, a fourth NPN transistor having its emitter collector path in parallel with said seat switch means and its base connected with said third junction through said first diode network whereby said fourth NPN transistor is rendered conductive in response to actuation of said seat belt switch means subsequent to actuation of said seat switch means to maintain the voltage at said first junction despite momentary deactuation of said seat switch means, means including a timing capacitor responsive to deactuation of said seat switch means for a predetermined time for lowering the voltage at said third junction and rendering said fourth NPN transistor nonconductive.

* * * * *